(12) United States Patent
Hardy

(10) Patent No.: US 7,945,587 B2
(45) Date of Patent: May 17, 2011

(54) RANDOM ALLOCATION OF MEDIA STORAGE UNITS

(75) Inventor: Edward W. Hardy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 309 days.

(21) Appl. No.: 11/973,756

(22) Filed: Oct. 10, 2007

(65) Prior Publication Data
US 2009/0125573 A1    May 14, 2009

(51) Int. Cl.
G06F 7/00      (2006.01)
G06F 17/30     (2006.01)
G06F 12/00     (2006.01)

(52) U.S. Cl. ........ 707/793; 707/803; 707/809; 707/824; 711/112; 711/170; 711/206

(58) Field of Classification Search ................. 707/205, 707/793
See application file for complete search history.

(56) References Cited

U.S. PATENT DOCUMENTS

| | | | | |
|---|---|---|---|---|
| 5,018,060 | A | * | 5/1991 | Gelb et al. ............................. 1/1 |
| 5,218,695 | A | * | 6/1993 | Noveck et al. ......................... 1/1 |
| 5,430,858 | A | | 7/1995 | Greeley et al. |
| 5,481,702 | A | | 1/1996 | Takahashi |
| 6,002,866 | A | * | 12/1999 | Fuller ........................... 707/755 |
| 6,032,161 | A | | 2/2000 | Fuller |
| 6,507,902 | B1 | | 1/2003 | Hodges et al. |
| 6,587,915 | B1 | * | 7/2003 | Kim .............................. 711/103 |
| 6,636,879 | B1 | | 10/2003 | Doucette et al. |
| 6,745,311 | B2 | | 6/2004 | Fabrizio et al. |
| 6,785,768 | B2 | * | 8/2004 | Peters et al. ................... 711/112 |
| 7,028,158 | B1 | | 4/2006 | Beatty et al. |
| 7,194,563 | B2 | | 3/2007 | Plourde, Jr. |
| 2002/0042859 | A1 | * | 4/2002 | Lowry .......................... 711/100 |
| 2002/0169940 | A1 | | 11/2002 | Kyler |
| 2004/0225855 | A1 | * | 11/2004 | Branch ......................... 711/170 |
| 2005/0022201 | A1 | * | 1/2005 | Kaneda et al. ................. 718/104 |
| 2007/0174367 | A1 | * | 7/2007 | Shapiro ......................... 707/205 |
| 2007/0186287 | A1 | * | 8/2007 | Slade .............................. 726/27 |
| 2008/0028004 | A1 | * | 1/2008 | Lee et al. ....................... 707/202 |
| 2008/0052444 | A1 | * | 2/2008 | Hwang et al. ................. 711/103 |
| 2008/0059692 | A1 | * | 3/2008 | Erez .............................. 711/103 |

OTHER PUBLICATIONS

Worringen, et al., "Fast Parallel Non-Contiguous File Access", Date: Nov. 15-21, 2003, pp. 1-18.
"Computer Forensics, Investigations and Security", Recovered May 29, 2007, http://www.x-ways.net/winhex/forensics.html.
Bates, Jim, "File Deletion in MS FAT Systems", Apr. 19, 1999, http://www.computer-investigations.com/arts/tech02.html.
Worringen et al., "Fast Parallel Non-Contiguous File Access", Nov. 15-21, 2003, http://www.ccrl-nece.de/publications/paper/public/LR-03-174a.pdf.

* cited by examiner

*Primary Examiner* — Don Wong
*Assistant Examiner* — Binh V Ho

(57) ABSTRACT

Described is a technology by which storage space in the form of allocation units (e.g., clusters of a storage volume) are intentionally allocated so as to likely be non-contiguous for a file's data. For example, random selection of each of the allocation units will likely provide non-contiguous allocation units; on solid state storage media, such a random distribution of a file's data does not significantly affect access times. In one aspect, a file system driver randomly allocates the allocation units, and records the allocation units in association with the file, e.g., in a master file table or similar database. Non-contiguous (e.g., random) allocation may be on demand as storage space is needed, and/or may be performed in anticipation of needing storage space for satisfying a later request. Once the storage space is no longer mapped to a file, reconstructing that file's data in forensic analysis is more difficult.

20 Claims, 4 Drawing Sheets

RANDOM ALLOCATION OF MEDIA STORAGE UNITS

BACKGROUND

The placement of allocation units (e.g., clusters) on a file system is sequential for purposes of access and speed of data retrieval. This is primarily due to the mechanical nature of the physical media (hard drive) access, where access times (as well as reducing physical degradation of the drive) benefit from sequential placement of allocation units across the media. Indeed, defragmentation programs exist for the purpose of keeping the allocation units of individual files sequential.

However, once the physical media is no longer secure, having sequential placement of allocation units assists in reconstructing the data, referred to as forensic analysis. For example, it is recommended that when discarded, a hard drive be wiped clean of all data or physically destroyed so that forensic analysis cannot be used to steal sensitive data. Such approaches to theft prevention are not always practiced, however, and thus forensic analysis of data remains a problem.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a request (e.g., a write request) corresponding to a need to allocate storage space in the form of allocation units (e.g., clusters) is handled by including intentionally allocating storage space that (likely) corresponds to non-contiguous allocation units. For example, random selection of each of the allocation units from among a storage volume's available free space is one way in which allocation will likely provide non-contiguous allocation units. As can be readily appreciated, once such non-contiguously allocated space is no longer mapped to a file, reconstructing that file's data in forensic analysis is more difficult because of the non-sequential file data.

In general, the request that corresponds to a need to allocate storage space comprises a file write request. Non-contiguous (e.g., random) allocation may be on demand based on processing such a request, and/or may be performed in anticipation of receiving such a request.

In one aspect, a storage media that is configured as a storage volume having allocation units is coupled to a file system driver that allocates allocation units of the storage volume. The file system is configured to randomly select at least one allocation unit to satisfy an allocation request that corresponds to a file. The file system records an association between the file and each allocation unit that is allocated to satisfy the request. The storage media may be solid state (e.g., non-volatile) storage media, and the allocation unit may be a cluster. In an NTFS-type file system, the file system records the association between the file and each allocation unit in a master file table for the storage volume.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards intentionally placing allocation units (e.g., clusters as typically referred to herein) randomly across media, especially solid-state storage media such as flash storage. As can be readily appreciated, having clusters spread randomly over the media helps prevent forensic analysis by making the analysis of the data more difficult, in that forensic analysts will need to piece together files cluster-by-cluster to make sense of the data.

While various examples used herein generally apply to a file system such as Microsoft Corporation's NT file system (NTFS) in which allocation units are clusters, and in which a database or the like (Master File Table or MFT) holds file-to-cluster mappings, it is readily understood that this is only one example file system. Further, while random placement of any file is described, pseudo-random or mostly-random placement are feasible alternatives, as are alternative mechanisms that randomizing only certain sensitive files or directories. Still further, while the rapid deletion of the structure on the disk in an NTFS model may be performed by removing the MFT or the like that holds the file-to-cluster mappings, to thereby make the reconstruction of the data on the disk far more difficult than if the files were laid out in contiguous, sequential blocks, an alternative is to overwrite the mappings with random data or mapping data that intentionally confuses forensic analysis. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data storage in general.

Figure 1:
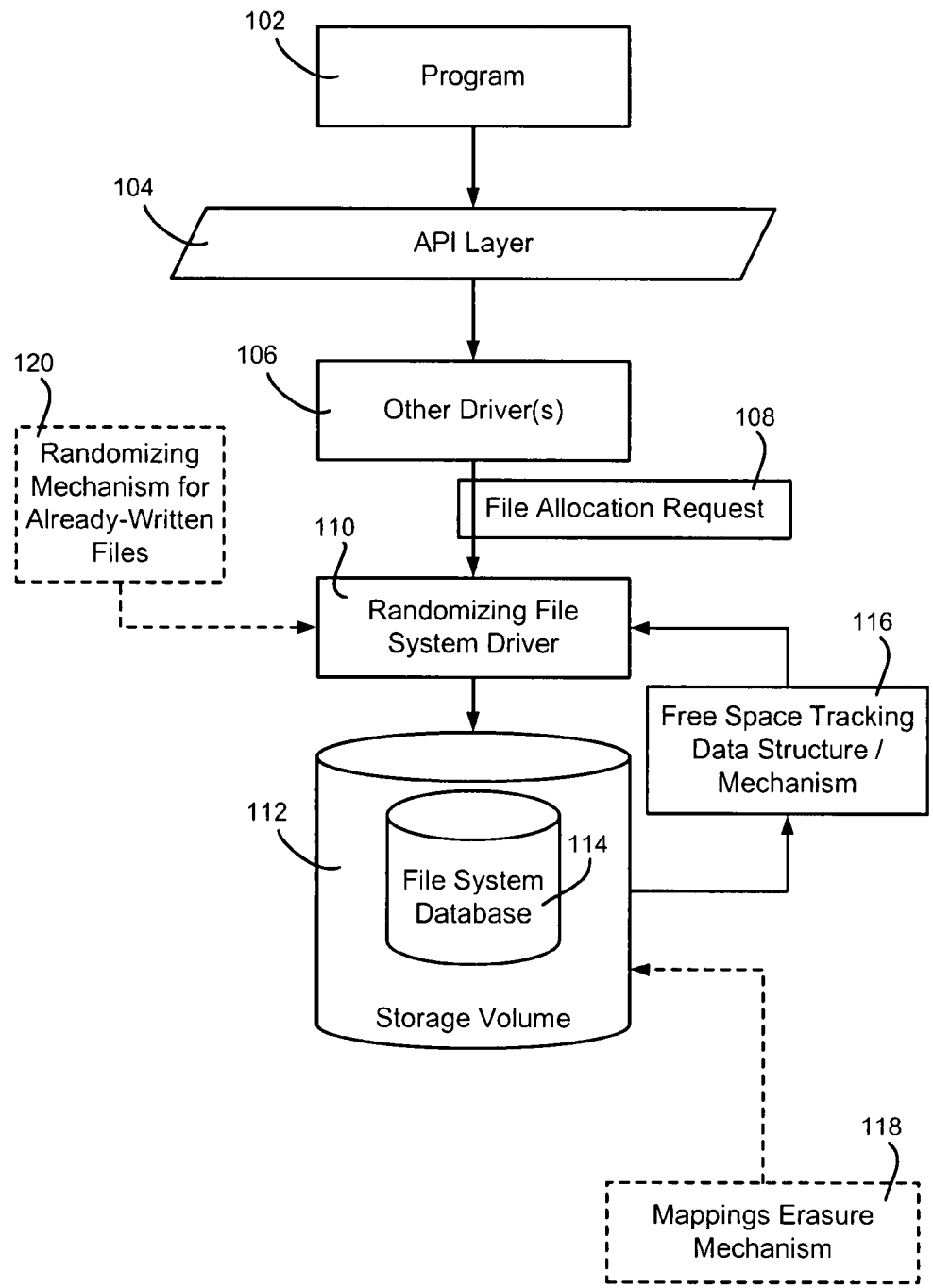
FIG. 1 is a block diagram representing example components including a file system that randomizes allocation units of files maintained on a storage volume.

Turning to FIG. 1, there is shown a general model including a file system configured for randomly allocating storage space for a file. In general, a program (e.g., application) 102 requests via an API layer 104 a file-system related action such as a file write that requires allocation of storage space. One or more drivers 106 may process the request, however as is known, a file allocation-related request 108 typically reaches a file-system driver of an operating system that fulfills requests for disk storage and retrieval requests from applications, which in this example implementation comprises a randomizing file system driver 110. Note that the randomizing file system driver 110 may be incorporated into a conventional file system driver, or may be a separate component that is associated with (e.g., called by) the file system driver.

As represented in FIG. 1 and described below, unlike a conventional file system driver which attempts to allocate a contiguous block of space for efficiency, the randomizing file system driver 110 randomly allocates clusters among the free space of a storage volume 112 (of the storage media), to the extent possible. In general, the file system randomly distributes the smallest units possible, namely clusters, throughout the physical address space.

For data retrieval and other purposes, the allocation mappings are recorded in a file system database 114, such as the MFT in an NTFS file system. Note that reading a randomized file is no different from the reading performed by current file system drivers. For example, in NTFS, the MFT is referenced to determine in which clusters the file is stored, and the appropriate clusters referenced for the file data.

Writes are also generally the same, except for the random allocation aspects, as described herein. For example, when a write request is made to the randomizing file system driver 110, the driver 110 checks permissions and ensures that total storage space for the request is available, which are standard file system operations. However, when space is allocated, the randomizing file system driver 110 randomly allocates clusters that have not been previously allocated to other files. This process continues until the request has been completely satisfied and the file write request is completely written.

Note that any mechanism or mechanism for randomly choosing a cluster may be used, and need not be consistent across requests or even individual cluster allocations. For example, as clusters are allocated, the MFT is updated and thereafter the next cluster to be used may be chosen. The next cluster or even a set of clusters may be chosen in advance of any allocation need; e.g., for efficiency the file system can randomly choose one or more clusters in anticipation of a future allocation request, such as in a background operation when processing power is plentiful. A deallocation request can reset anticipated allocations so that files are randomly distributed among additional free space. As another example, a random allocation mechanism can be used such that only certain file types (or files in certain directories) may be flagged for randomization; however randomizing only a subset of the files means that non-randomized files will be generally contiguous, whereby randomization within the remaining space will occur on a smaller portion of the volume.

Figure 2:
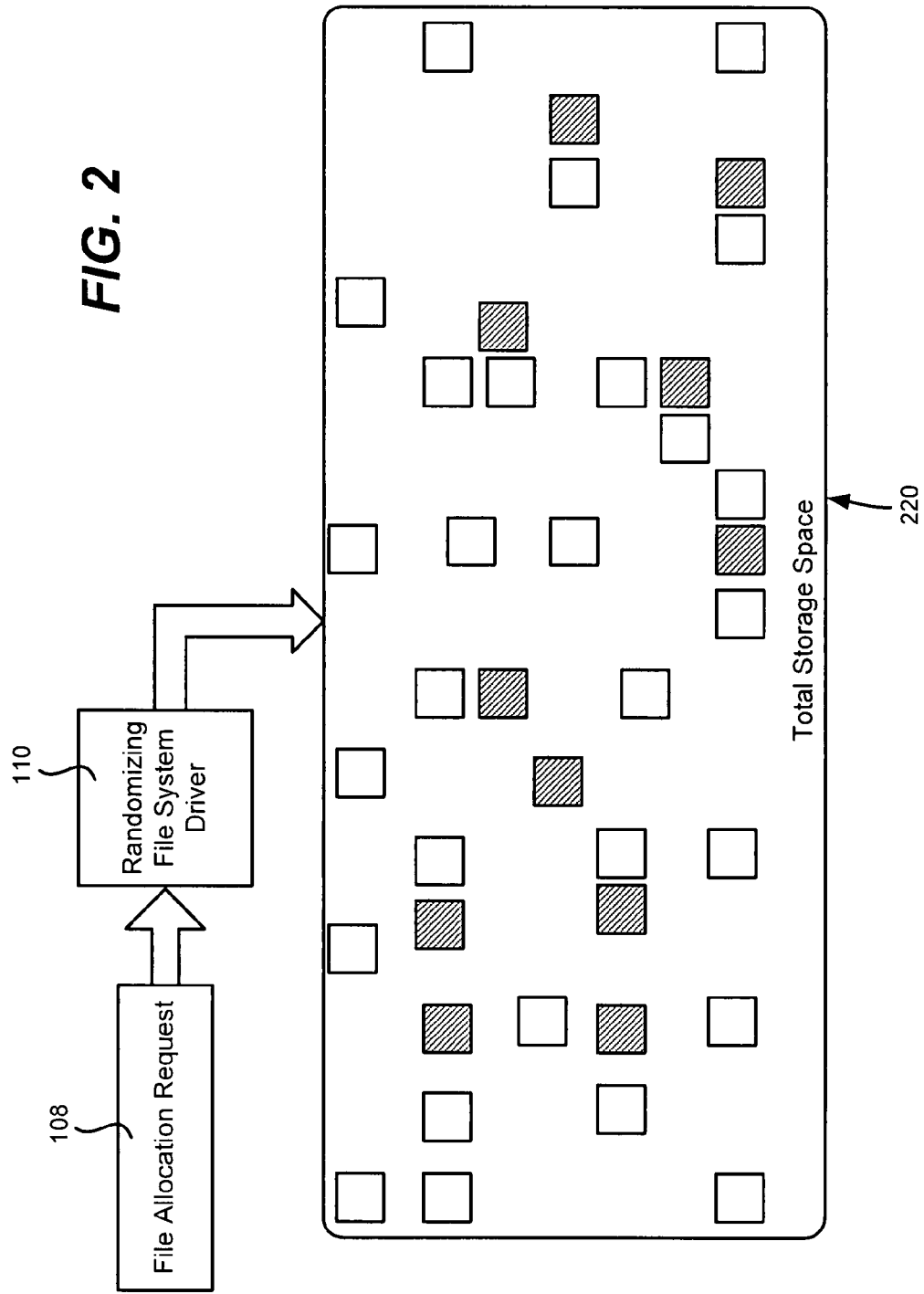
FIG. 2 is a representation of allocation units corresponding to files randomized throughout the storage space of a storage volume.

FIG. 2 provides an example of the random allocation, in which the non-shaded blocks represent previously allocated clusters, and the shaded blocks represent newly allocated clusters for a file allocation request 108 to the randomizing file system driver 110. As can be seen, the random distribution of clusters will separate a file's data across the volume's total storage space 220.

Note that with solid-state media, even though the clusters are randomly distributed, the access times are not significantly affected by random placement of clusters across the media. The effect of random cluster allocation is thus basically transparent to the operating system and users. In this example implementation, only the file system is changed to facilitate the purposeful random placement of clusters on the media.

Figure 3:
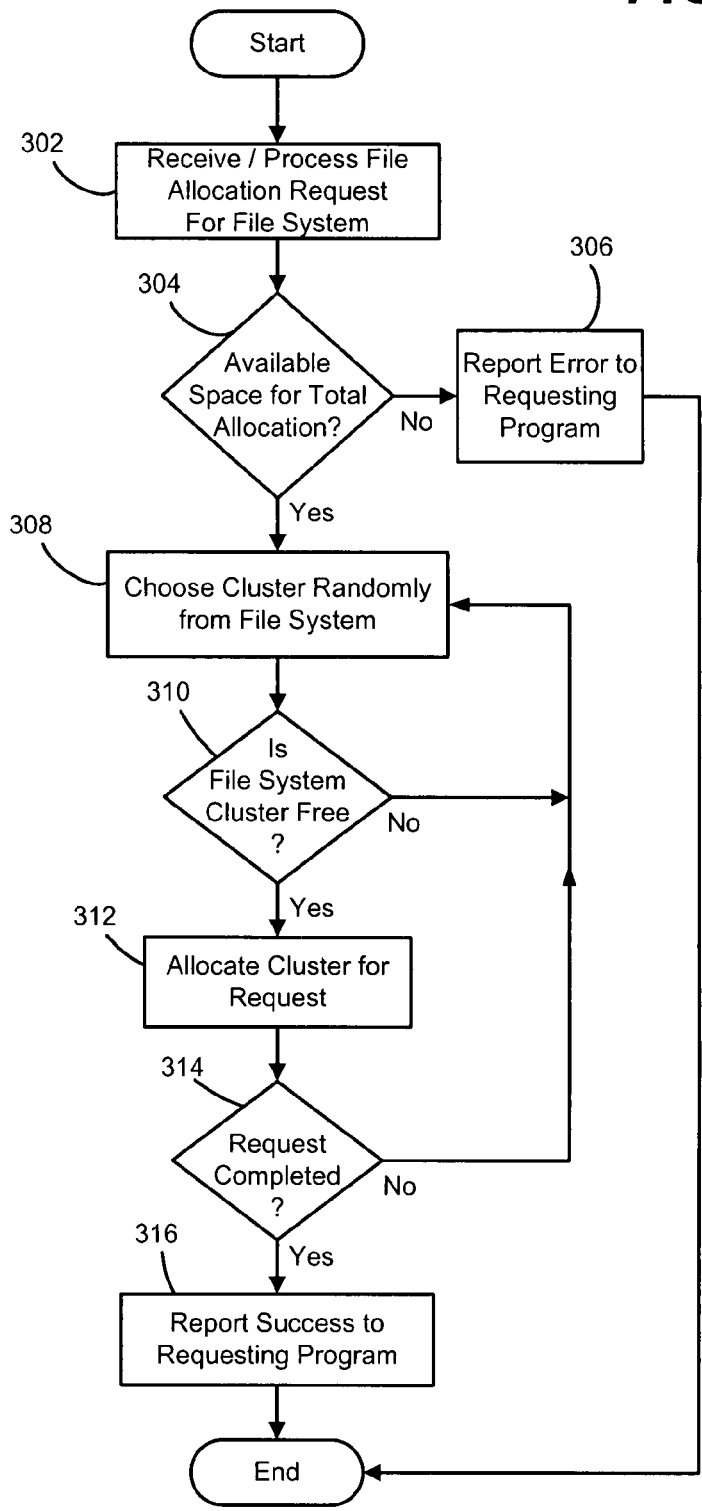
FIG. 3 is a flow diagram representing example steps that may be taken to randomly distribute a file's allocation units.

FIG. 3 provides a flow diagram that shows example steps that may be taken to randomly allocate clusters in response to a request (step 302) for file allocation. Step 304 represents checking that there is sufficient storage space for the total allocation, and if not, branches to step 306 to report an error to the requesting program. Note that other checks (permissions, quotas and so forth) are typically also performed before allocation, but are not represented in FIG. 3 for purposes of brevity.

If sufficient space exists, step 304 branches to step 308 where a cluster is randomly selected, such as by generating a random number corresponding to a particular cluster among the storage space. Note that in a system in which only certain files or file types are flagged for randomizing, step 308 may also represent determining that the request is one that is to have randomly distributed allocation units. Step 310 evaluates whether the randomly selected cluster is free, branching back to step 308 if not, whereby a different cluster is selected and evaluated. A free space data structure 116 (FIG. 1), typically a bitmap, tracks free clusters versus used clusters, and the bitmap or the like can be accessed for this purpose. However, alternatively or in addition to such a bitmap access, other mechanisms may be used for the data structure/free space tracking, such as randomly finding a cluster identifier in a table that tracks free clusters. Such a table may be particularly useful when only a relatively small number of clusters remain free, (to avoid repeatedly having to generate random numbers until one of the free clusters is eventually found). Further, as set forth above, one or more clusters may be randomly allocated in anticipation of future requests for free space.

When a free cluster is found, step 312 allocates that cluster for the request, tracking its location in the file system database 114 (FIG. 1) for future reference. Step 314 repeats the random allocation process until the request is completed. When complete, step 316 reports success to the requesting program.

Another aspect is directed towards making the storage volume more secure when the file data is no longer needed on that media. To this end, the file system database 114 (FIG. 1, along with any backups) that tracks storage allocations may be deleted, such as by an optional (as represented by the dashed block) mappings erasure mechanism 118, whereby without the mappings the randomly distributed file data is difficult to reassemble. In NTFS this operation deletes the master file table, leaving unmapped random file data. As can be readily appreciated, when the mappings are erased, the random-file storage volume becomes more useless with respect to forensic analysis than a mechanical drive that typically contains many sequential clusters of file data. Note that the optional example mechanism 120 is shown in FIG. 1 as being coupled to the storage volume 112, but can be located elsewhere, such as a program that communicates through the API layer 104, or a mechanism coupled to the randomizing file system driver 110.

Another aspect is directed towards an optional (as represented by the dashed block) randomizing mechanism 120, such as a background process, utility or the like that can randomize or otherwise intentionally fragment allocation units of files. This is valuable for converting the mostly-sequential storage volumes or the like of already existing devices into storage having randomly placed file clusters. For example, many files such as a personal images or video may be written once and thereafter only read (and thus not moved), but the user may want the data randomly distributed. This also may be beneficial when upgrading the file system driver to an existing system; because of a previous driver, an earlier volume state has non-randomized file data, whereby later randomization is only to a small subset of an existing volume. Note that the optional example mechanism 120 is shown in FIG. 1 as being coupled to the randomizing file system driver 110, but can be located elsewhere, such as a program that communicates through the API layer 104.

Exemplary Operating Environment

The various examples herein are primarily described with solid state media, such as often found in handheld computing devices such as mobile telephones. However, as solid state media continues to be more popular, other devices including conventional personal computers, laptops and so forth are including solid state media. Thus, while the exemplary operating environment described below is in the form of a mobile computing and communications device, the technology described herein is not limited to any type of computing device/storage media, but rather applies to any computing device/storage media, especially solid-state media.

Figure 4:
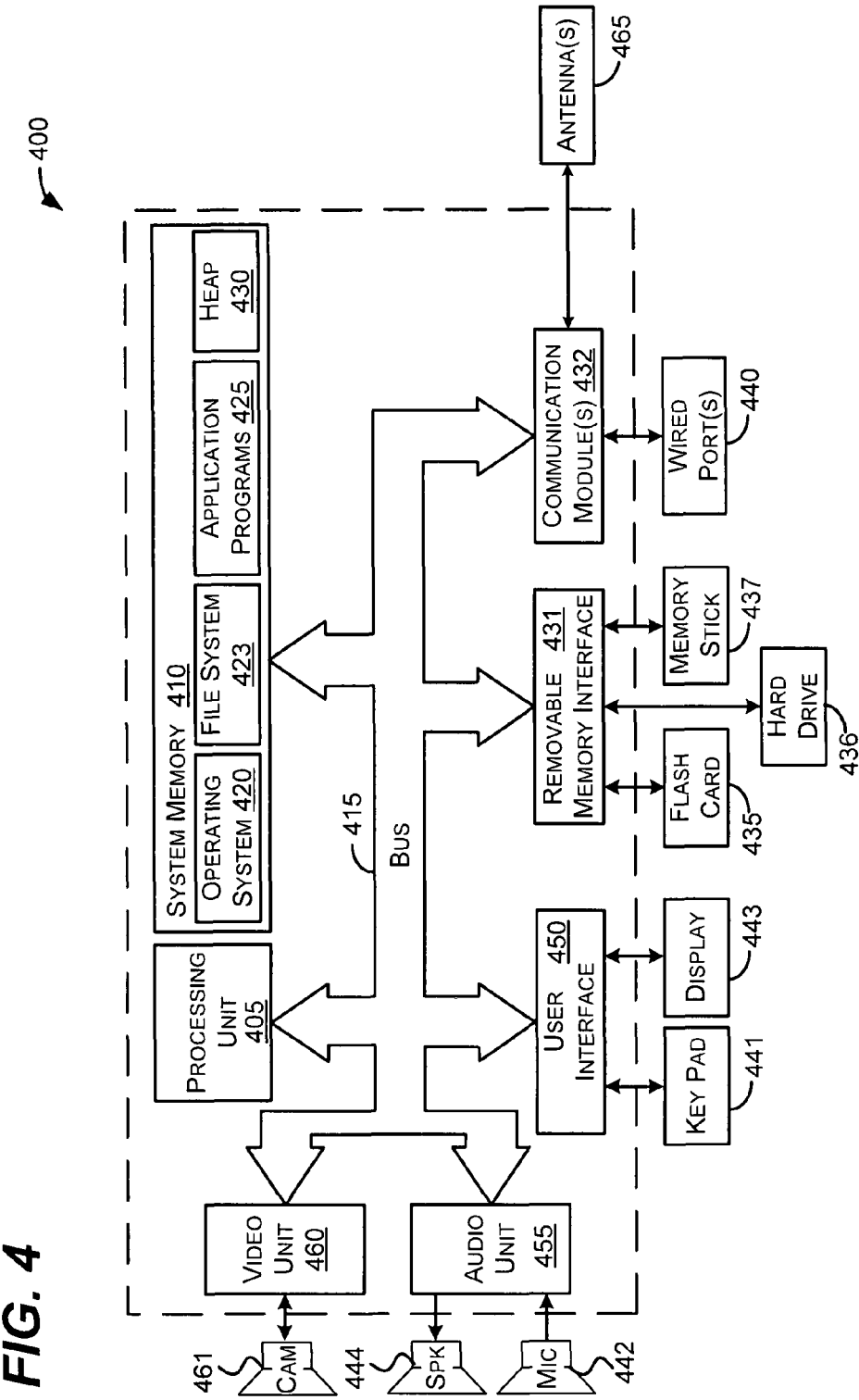
FIG. 4 shows an illustrative example of a computing and communication device into which various aspects of the present invention may be incorporated.

FIG. 4 illustrates an example of a suitable mobile device 400 on which aspects of the example subject matter described in FIGS. 1-3 may be implemented. The mobile device 400 is only one example of a device and is not intended to suggest any limitation as to the scope of use or functionality of aspects of the subject matter described herein. Neither should the mobile device 400 be interpreted as having any dependency or requirement relating to any one or combination of components illustrated in the exemplary mobile device 400.

With reference to FIG. 4, an exemplary device for implementing aspects of the subject matter described herein includes a mobile device 400. In some embodiments, the mobile device 400 comprises a cell phone, a handheld device that allows voice communications with others, some other voice communications device, or the like. In these embodiments, the mobile device 400 may be equipped with a camera for taking pictures, although this may not be required in other embodiments. In other embodiments, the mobile device 400 comprises a personal digital assistant (PDA), hand-held gaming device, notebook computer, printer, appliance including a set-top, media center, or other appliance, other mobile devices, or the like. In yet other embodiments, the mobile device 400 may comprise devices that are generally considered non-mobile such as personal computers, servers, or the like.

Components of the mobile device 400 may include, but are not limited to, a processing unit 405, system memory 410, and a bus 415 that couples various system components including the system memory 410 to the processing unit 405. The bus 415 may include any of several types of bus structures including a memory bus, memory controller, a peripheral bus, and a local bus using any of a variety of bus architectures, and the like. The bus 415 allows data to be transmitted between various components of the mobile device 400.

The mobile device 400 may include a variety of computer-readable media. Computer-readable media can be any available media that can be accessed by the mobile device 400 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 400.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, WiFi, WiMAX, and other wireless media. Combinations of any of the above should also be included within the scope of computer-readable media.

The system memory 410 includes computer storage media in the form of volatile and/or nonvolatile memory and may include read only memory (ROM) and random access memory (RAM). On a mobile device such as a cell phone, operating system code 420 is sometimes included in ROM although, in other embodiments, this is not required. In this example, the operating system code works in conjunction with a file system 423 to store data in the form of files. Application programs 425 are often placed in RAM although again, in other embodiments, application programs may be placed in ROM or in other computer-readable memory. The heap 430 provides memory for state associated with the operating system 420 and the application programs 425. For example, the operating system 420 and application programs 425 may store variables and data structures in the heap 430 during their operations.

The exemplified mobile device 400 may also include other removable/non-removable, volatile/nonvolatile memory. By way of example, FIG. 4 illustrates a flash card 435, a hard disk drive 436, and a memory stick 437. The hard disk drive 436 may be miniaturized to fit in a memory slot, for example. The mobile device 400 may interface with these types of nonvolatile removable memory via a removable memory interface 431, or may be connected via a universal serial bus (USB), IEEE 4394, one or more of the wired port(s) 440, or antenna(s) 465. In these embodiments, the removable memory devices 435-437 may interface with the mobile device via the communications module(s) 432. In some embodiments, not all of these types of memory may be included on a single mobile device. In other embodiments, one or more of these and other types of removable memory may be included on a single mobile device.

In some embodiments, the hard disk drive 436 may be connected in such a way as to be more permanently attached to the mobile device 400. For example, the hard disk drive 436 may be connected to an interface such as parallel advanced technology attachment (PATA), serial advanced technology attachment (SATA) or otherwise, which may be connected to the bus 415. In such embodiments, removing the hard drive may involve removing a cover of the mobile device 400 and removing screws or other fasteners that connect the hard drive 436 to support structures within the mobile device 400.

The removable memory devices 435-437 and their associated computer storage media, discussed above and illustrated in FIG. 4, provide storage of computer-readable instructions, program modules, data structures, and other data for the mobile device 400. For example, the removable memory device or devices 435-437 may store images taken by the mobile device 400, voice recordings, contact information, programs, data for the programs and so forth.

A user may enter commands and information into the mobile device 400 through input devices such as a key pad 441 and the microphone 442. In some embodiments, the display 443 may be touch-sensitive screen and may allow a user to enter commands and information thereon. The key pad 441 and display 443 may be connected to the processing unit 405 through a user input interface 450 that is coupled to the bus 415, but may also be connected by other interface and bus structures, such as the communications module(s) 432 and wired port(s) 440.

A user may communicate with other users via speaking into the microphone 442 and via text messages that are entered on the key pad 441 or a touch sensitive display 443, for example. The audio unit 455 may provide electrical signals to drive the speaker 444 as well as receive and digitize audio signals received from the microphone 442.

The mobile device 400 may include a video unit 460 that provides signals to drive a camera 461. The video unit 460 may also receive images obtained by the camera 461 and provide these images to the processing unit 405 and/or memory included on the mobile device 400. The images obtained by the camera 461 may comprise video, one or more images that do not form a video, or some combination thereof.

The communication module(s) 432 may provide signals to and receive signals from one or more antenna(s) 465. One of the antenna(s) 465 may transmit and receive messages for a cell phone network. Another antenna may transmit and receive Bluetooth® messages. Yet another antenna (or a shared antenna) may transmit and receive network messages via a wireless Ethernet network standard.

In some embodiments, a single antenna may be used to transmit and/or receive messages for more than one type of network. For example, a single antenna may transmit and receive voice and packet messages.

When operated in a networked environment, the mobile device 400 may connect to one or more remote devices. The remote devices may include a personal computer, a server, a router, a network PC, a cell phone, a peer device or other common network node, and typically includes many or all of the elements described above relative to the mobile device 400.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server is often used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium comprising computer-executable instructions, which when executed perform acts, comprising:
    allocating a primary two or more randomly selected non-contiguous allocation units of a single storage unit, the primary two or more randomly selected non-contiguous allocation units corresponding to a first file, the single storage unit not comprising a plurality of non-volatile drives, the first file associated with a predetermined file type, wherein allocating the primary two or more allocation units comprises mapping the allocation units in association with the first file;
    allocating a secondary two or more allocation units of the single storage unit, the secondary two or more allocation units corresponding to a second file, the second file not associated with the predetermined file type; and erasing the mapping without erasing data stored in the primary two or more allocation units.

2. The computer-readable storage medium of claim 1, wherein the secondary two or more allocation units are contiguous.

3. The computer-readable storage medium of claim 1, wherein at least two allocation units are selected in anticipation of a request.

4. The computer-readable storage medium of claim 1, comprising processing a file write request.

5. The computer-readable storage medium of claim 1, comprising reallocating allocation units if a predetermined number of contiguous allocation units are allocated.

6. In a computing environment, a system comprising:
    a storage media that is configured as a storage volume and comprises a plurality of allocation units, the storage media comprising a single non-volatile drive; and
    a file system comprising a driver component configured to allocate a plurality of allocation units of the storage volume in response to a request to allocate allocation units, the plurality of allocation units comprising a primary two or more allocation units and a secondary two or more allocation units, the primary two or more allocation units corresponding to a first file, the secondary two or more allocation units corresponding to a second file, the first file associated with a predetermined file type, the second file not associated with the predetermined file type, wherein allocating the plurality of allocation units comprises:
        randomly selecting a first allocation unit of the primary two or more allocation units;
        randomly selecting a second allocation unit of the primary two or more allocation units;
        mapping the primary two or more allocation units in association with the first file; and
        if a determination is made that the first and second allocation units are contiguous with one another, randomly selecting a third allocation unit of the plurality of allocation units and unselecting the second allocation unit; and
    the file system configured to erase the mapping without erasing data stored in the primary two or more allocation units.

7. The system of claim 6, wherein the storage media comprises a single solid state drive.

8. The system of claim 6, wherein respective allocation units comprise a cluster.

9. The system of claim 8, wherein the file system comprises an NTFS-type file system.

10. The system of claim 6, comprising a randomizing mechanism coupled to the storage volume and configured to reallocate allocation units associated with a file if two or more contiguous allocation units are associated with the file.

11. The system of claim 6, wherein the driver component is configured to randomly select a fourth allocation unit based on a free space data structure.

12. The system of claim 11, wherein the free space data structure is configured to track at least one of allocation units that are free and allocation units that are already allocated.

13. The system of claim 6, comprising a randomizing mechanism coupled to the storage volume and configured to reallocate allocation units associated with the second file, wherein before reallocation, the second file was associated with substantially sequential allocation units, and wherein after reallocation, the second file is associated with randomly distributed substantially non-sequential allocation units.

14. The system of claim 6, wherein allocating the plurality of allocation units comprises randomly selecting a fourth allocation unit of the plurality of allocation units and unselecting the first allocation unit if the determination is made that the first and second allocation units are contiguous.

15. In a computing environment, a method comprising:
processing a request corresponding to a need to allocate allocation units of a single storage unit for file data of a file, the single storage unit comprising a single non-volatile drive;
allocating at least four allocation units of the single storage unit based upon the request, the at least four allocation units comprising a primary two or more non-contiguous allocation units and a secondary two or more non-contiguous allocation units, the primary two or more allocation units corresponding to a first file, the secondary two or more allocation units corresponding to a second file, the first file associated with a predetermined file type, the second file not associated with the predetermined file type, wherein allocating the at least four allocation units comprises randomly selecting a first allocation unit of the primary two or more allocation units and randomly selecting a second allocation unit of the primary two or more allocation units and mapping the primary two or more allocation units in association with the first file;
reallocating at least one of the first allocation unit and the second allocation unit associated with the first file if the first allocation unit and the second allocation unit are contiguous, and
erasing the mapping without erasing data stored in the primary two or more allocation units.

16. The method of claim 15, comprising recording at least one of the allocated and the reallocated allocation units in a set of mappings maintained in association with the storage unit, the mappings indicating which allocation units are associated with the file.

17. The method of claim 16, comprising erasing the set of mappings, wherein erasing the set of mappings does not comprise erasing data stored in the allocation units.

18. The method of claim 15, wherein processing the request comprises determining that the request is one that is to allocate one or more randomly selected allocation units.

19. The method of claim 15, comprising reallocating at least one of a third allocation unit and a fourth allocation unit associated with the second file if the third allocation unit and the fourth allocation unit are contiguous.

20. The method of claim 15, comprising mapping the secondary two or more allocation units in association with the second file.

* * * * *